Oct. 11, 1966
F. COHEN
3,277,606
LAWN EDGING MATERIAL
Filed Oct. 1, 1964
2 Sheets-Sheet 1
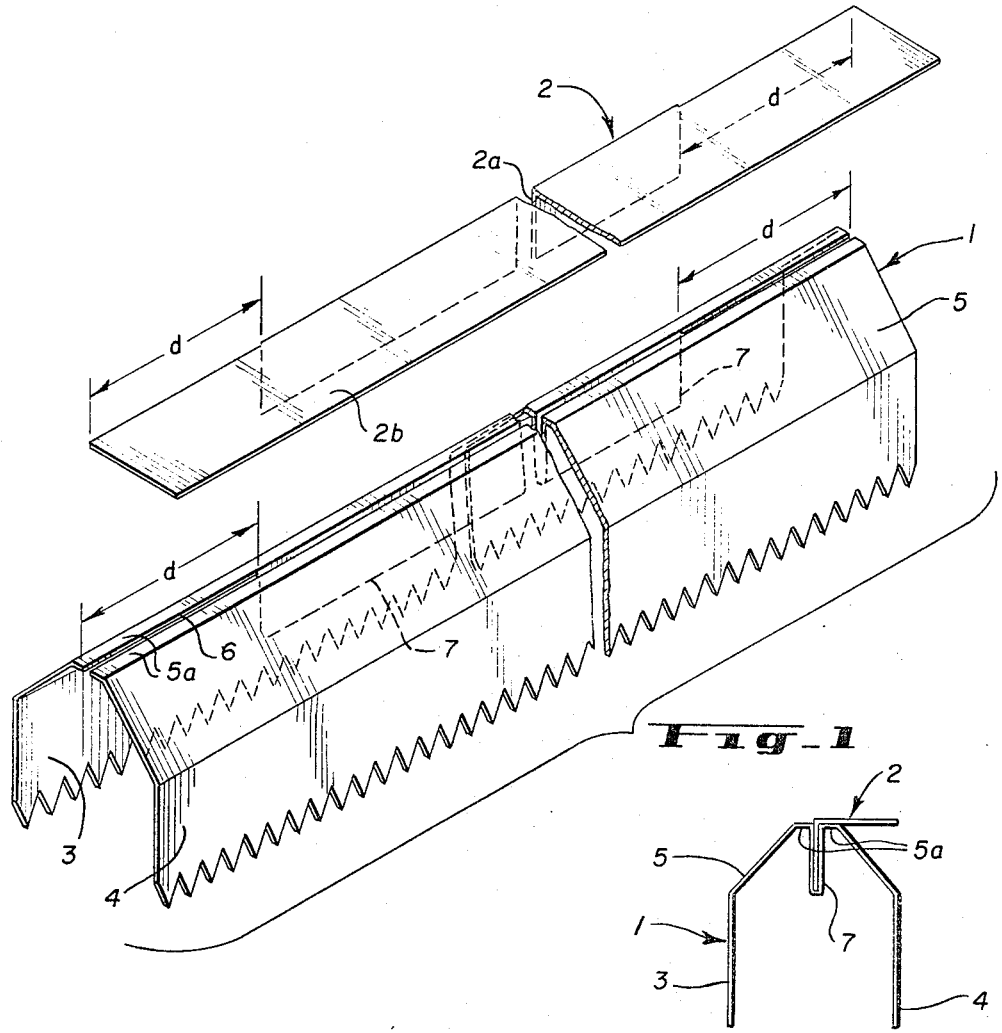
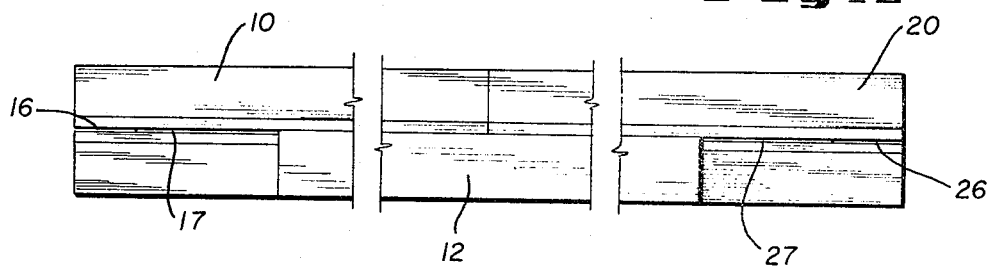
INVENTOR.
Felix Cohen
BY
ATTORNEYS Oct. 11, 1966
F. COHEN
3,277,606
LAWN EDGING MATERIAL
Filed Oct. 1, 1964
2 Sheets-Sheet 2
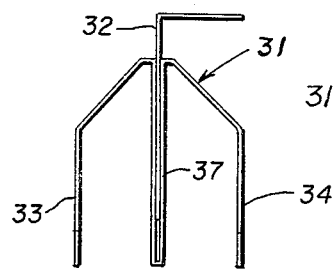
Fig_4
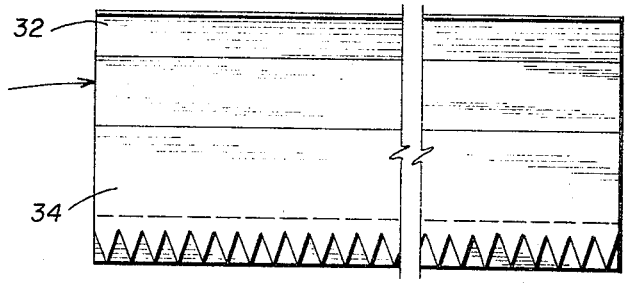
Fig_5
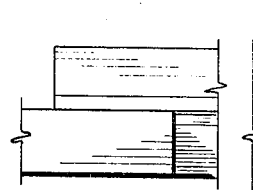
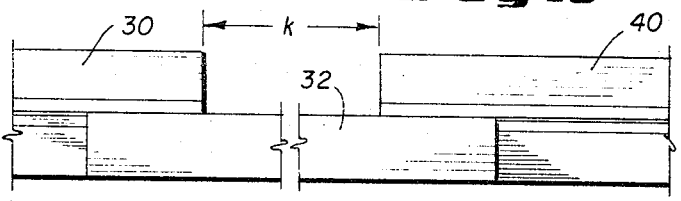
Fig_6
Fig_7
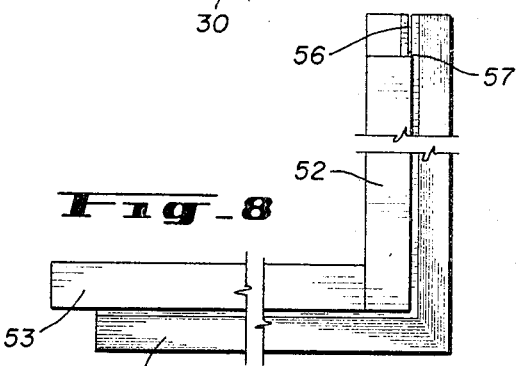
Fig_8
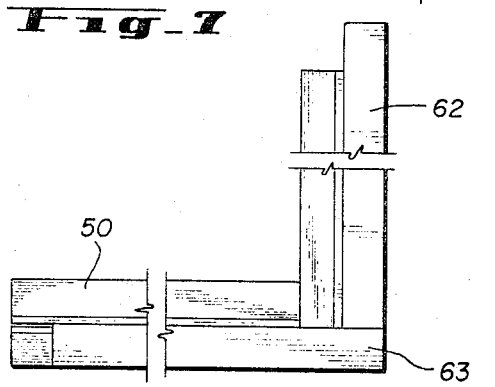
Fig_9
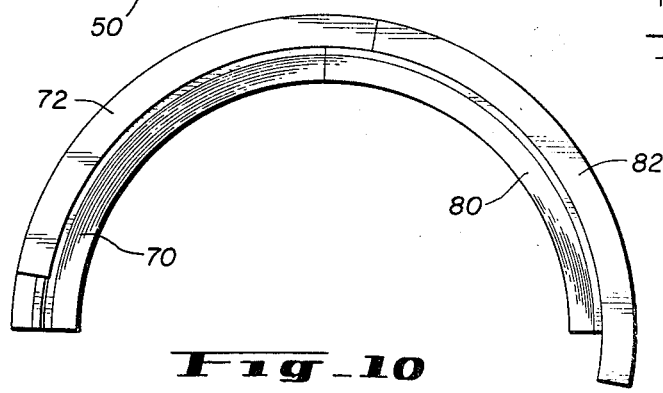
Fig_10
INVENTOR.
Felix Cohen
BY
McGrew and Edwards
ATTORNEYS United States Patent Office 3,277,606
Patented Oct. 11, 1966

3,277,606
LAWN EDGING MATERIAL
Felix Cohen, 2465 S. Kearney St., Denver, Colo.
Filed Oct. 1, 1964, Ser. No. 400,872
9 Claims. (Cl. 47—33)

This invention relates generally to edging materials and more particularly to related embodiments and improvements in edging materials disclosed in my copending application Ser. No. 388,131, filed Aug. 7, 1964.

As related in my copending application, edging materials have proved satisfactory in inhibiting grass growth into adjoining soil areas. Edging materials provide a distinct advantage over edging with a cutting tool in maintaining the same division between adjoining soil and grassed areas because several edgings of the grass with a cutting tool usually alter such division. In selection of edging material the ease in installation and versatility in conforming it to special lengths and configurations are important considerations.

Therefore, it is an object of my invention to provide improvements in edging materials which will maintain uniform division between grass and soil areas.

It is another object of my invention to provide sections of edging material which are easily installed with close alinement between adjoining sections.

Another object of my invention is to provide improvements in joining sections of edging material to accommodate special length requirements.

Other objects, advantages and capabilities of my invention will become apparent from the following description taken in conjunction with the accompanying drawings showing only preferred embodiments of the invention.

In the drawings:

FIG. 1 is a perspective view of edging material embodying my invention showing the top member removed from the base member;

FIG. 2 is a sectional view of the edging material shown in FIG. 1 but to reduced scale and with the top member positioned in the base member;

FIG. 3 is a plan view of abutting base sections shown in FIG. 1 joined by a top member;

FIG. 4 is a sectional view of another embodiment of edging material showing the top member partially seated in the base member;

FIG. 5 is a side elevation of the edging material shown in FIG. 4;

FIG. 6 is a plan view of spaced base sections shown in FIGS. 4 and 5 joined by the top member;

FIG. 7 is a side elevation view of FIG. 6;

FIG. 8 is a plan view of a right angle section of edging material with the top member extending for interior grass inhibiting;

FIG. 9 is a plan view of a right angle section of edging material with the top member extending for exterior grass inhibiting; and FIG. 10 is a plan view of a semicircular section of edging material embodying my invention.

Referring to the drawings and particularly to FIGS. 1 and 2, edging material therein illustrated separates adjoining grass and soil areas as described more fully in my copending application previously referred to. This edging material is generally an elongated body of stiff material made in uniform lengths and of special configurations for separating various garden and yard areas.

This generally elongated body comprises a base member 1 and a top member 2 of equal lengths. The base member 1 has parallel depending portions 3, 4 which preferably are of equal dimension, one of which is positioned in a bordering grassed area and the other at a soil area. These depending portions have serrated earth penetrating lower edges and are symmetrically disposed by an interconnecting portion 5 so as to penetrate the soil to a common depth and may thereby be positioned in the grassed area or soil area interchangeably.

The interconnecting portion 5 slopes upwardly from the depending portion to a generally flat central portion 5a. The sloping area may be flat, as shown, or have slight convex curvature. Centrally of the flat portion there is a slot 6 including a U-shaped portion 7 extending parallel to the depending portions 3, 4 and terminating substantially above the earth penetrating edges of the depending portions approximately at their junction with the interconnecting portion 5. As shown in FIG. 1, the U-shaped portion 7 also terminates a substantial and equal distanced from each end of the base member 1.

The top member 2 is of right angle section having one side 2a of slightly less thickness than the slot 6 and seats in the U-shaped portion 7 in close fitting relationship to provide a substantially unitary body of edging material. The other side 2b rests on flat portion 5a (FIG. 2) and extends horizontally to the depending portion 4 adjoining the grassed area in spaced overhanging relation to bordering grass in the grass area. The side 2a of the top member 2 terminates a distance d from the ends of side 2b. The overhanging relationship with the grass precludes light from reaching the adjoining grass and thereby inhibits its growth as was previously described in my copending application referred to above.

A further function of the top member is for joining and alining additional sections of base members. For this function there is illustrated in FIG. 3 two base members 10 and 20 similar to those shown in FIG. 1 which are disposed in abutting relationship. Base member 10 has a slot 16 with U-shaped portion 17 and base member 20 has a slot 26 with U-shaped portion 27. A top member 12 fits into the alined slots 16, 27 as is shown in FIG. 2, thereby joining and alining base members 10 and 20 in a tight fitting relationship. It is understood that the overlapping of the top member may vary from a slight displacement beyond the end of its supporting base member to an equal extension into the slots of the adjoining base member as is illustrated in FIG. 3 to meet particular strength and dimension requirements.

An alternative embodiment is illustrated in FIGS. 4 through 7 which is generally similar to FIG. 1 with base member 31 having depending portions 33, 34. However, the U-shaped portion 37 of the slot extends substantially to the same depth as the penetrating edges of depending portions 33, 34. The vertical side of top member 32 is correspondingly increased in depth so as to extend to the bottom of the U-shaped portion 37.

Base members 30 and 40 (FIGS. 6 and 7) are disposed apart a substantial distance K with a top member 32 bridging the space therebetween and joining and alining the spaced base members 30, 40. Top member 32 extends to substantially the same depth as the base members 30, 40, thereby providing a separation between adjoining grassed and soil areas. Fewer base members are required for a length of edging material when utilizing this embodiment.

A right angle section of edging material is illustrated in FIGS. 8 and 9 which includes a base member 50 formed in a right angle section having a central slotted portion 56 joining at right angles and including a U-shaped portion 57 terminating in spaced relationship from its ends.

For inhibiting grass growth on the inside of the right angle section (FIG. 8) a pair of straight top members 52, 53 fits in the adjacent slot with the end of one top member 53 abutting the side of the other member 52 and the one top member 53 extending beyond the end of the base member for joining another section. The other top member 52 terminates at a distance from the end of the base member to accommodate an adjoining top section member. FIG. 9 illustrates the arrangement of straight top members 62, 63 on the right angle section base member 50 for inhibiting grass growth along the outside of the edging material. The edge of one of the top members 62 abuts the side of the other top member 63 with the one top member 62 extending beyond one end of the base member 63 and the top member 63 terminating short of the other end of the base member to accommodate joining of other sections as previously described.

In FIG. 10 there is illustrated a semicircular strip of edging material including a pair of abutting circular sections 70, 80 each spanning 45°. These sections are joined by a top member 72 of circular section which extends beyond the end of base section 70 into the slot of base section 80 thereby joining the two sections. The top member 72 is preferably of the same length as base section 70. The top member 82 for base section 80 extends from an abutting relationship with top member 72 and extends beyond the end of base section 80 for adjoining another base section.

While certain preferred embodiments of my invention have been set forth and described, it is understood that certain modifications could be made by persons skilled in the art without departing from the spirit and scope thereof and such variations are covered by the scope of the appended claims.

I claim:

1. Edging material for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the depending portions, and a second member having portions being held in detachable interfitting relationship with cooperating portions of said interconnecting portion and having a cantilever portion extending rearwardly from and at least partially supported by the interconnecting portion in spaced overhanging relation to bordering grass in the grassed area.

2. Edging material for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the tops of the depending portions, and a second member having portions being held in detachable interfitting relationship and engaging with cooperating portions of said interconnecting portion and having a cantilever portion extending rearwardly from and at least partially supported by the interconnecting portion in spaced overhanging relation to bordering grass in the grassed area.

3. Edging material for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the tops of the depending portions, said interconnecting portion having a slotted portion intermediate its ends, and a second member in detachable connection with said slotted portion and having a cantilever portion extending rearwardly from and at least partially supported by the interconnecting portion in spaced overhanging relation to bordering grass in the grassed area.

4. Edging material according to claim 3 in which the first member is of right angle section.

5. Edging material according to claim 3 in which the first and second members are of substantially semicircular sections.

6. Edging material for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the tops of the depending portions, said interconnecting portion having a central vertical slot terminating in spaced relation with its ends, and a second member in detachable connection with said slot and having a cantilever portion being of right angle section extending rearwardly from and at least partially supported by the interconnecting portion in spaced overhanging relation to bordering grass in the grassed area.

7. Edging material for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the tops of the depending portions, and a second member having portions being held in detachable interfitting relationship and engaging with cooperating portions of said interconnecting portion and having a cantilever portion extending rearwardly from and at least partially supported by the interconnecting portion in spaced overhanging relation to bordering grass in the grassed area, the second member extending beyond the end of the first member for joining a similar first member abutting said first member to provide selected interconnected lengths of said body.

8. Edging material for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the tops of the depending portions, and a second member having portions being held in detachable interfitting relationship and engaging with cooperating portions of said interconnecting portion and having a cantilever portion extending rearwardly from and at least partially supported by the interconnecting portion in spaced overhanging relation to bordering grass in the grassed area, the second member extending beyond the end of the first member for joining a similar first member spaced from said first member to provide selected interconnected lengths of said body.

9. Edging materials for separation of adjoining grassed and soil areas comprising an elongated body of stiff material including a first member having substantially parallel depending portions of substantially equal dimension adapted to be inserted into forwardly and rearwardly earth penetrating positions to a substantially common depth, the forward position being disposed at a soil area and the rearward position being disposed in a bordering grassed area, an interconnecting portion having a sloping surface between the tops of the depending portions, said interconnecting portion having a slotted portion intermediate its ends, and a second member in detachable connection with said slotted portion, the first member providing a cantilever portion and extending rearwardly from and at least partially supported by the interconnecting portion in spaced overhanging relation to bordering grass in the grassed area, the second member extending beyond the end of the first member and fitting into a slotted portion of a similar first member joining it to said first member to provide selected interconnected lengths of said body.

References Cited by the Examiner

UNITED STATES PATENTS

| | | | |
|---|---|---|---|
| 2,751,250 | 6/1956 | Block | 239—201 |
| 2,865,136 | 12/1958 | Scott et al. | 47—33 |
| 3,015,448 | 1/1962 | Hurless | 42—25 X |

FOREIGN PATENTS 102,231  11/1916  Great Britain.

ABRAHAM G. STONE, *Primary Examiner.*

ANTONIO F. GUIDA, *Examiner.*

J. R. OAKS, *Assistant Examiner.*